April 26, 1960 　　J. F. NICKLAS　　2,934,156
CULTIVATOR
Filed May 13, 1957

INVENTOR.
JULIUS F. NICKLAS
BY
Flournoy Corey
ATTORNEY.

United States Patent Office 2,934,156
Patented Apr. 26, 1960

2,934,156
CULTIVATOR
Julius F. Nicklas, Guernsey, Iowa
Application May 13, 1957, Serial No. 658,626
2 Claims. (Cl. 172—771)

This invention relates to cultivating tools and has particular relation to a cultivating shovel for breaking up the soil and burying the weeds and grass adjacent the roots of the crop plant.

The demands of modern farming require that the soil be worked more systematically than has been the practice in years past and that the various stages of operation, particularly that of cultivating of the crops, be carried out at specific times without regard to the weather and soil conditions.

It is desirable, in many feed and grain crops, such as corn, soy beans and the like, to clear the weeds at certain stages of growth, but frequently the ground conditions at that particular time makes cultivation extremely difficult. The ground may be so dry that conventional shovels will not penetrate the crust and move the dirt. Or, alternatively, the soil may be so wet that clean cleavage cannot be obtained and the farmer finds himself churning mud.

It is one of the primary objects of my invention to provide a cultivator shovel which, by its configuration, will be drawn into the soil to the desired depth regardless of the condition of the soil itself.

It is a still further object of my invention to provide a device which, when moved through the soil, will by reason of its configuration shed loose roots, grass and other trash and prevent it from becoming entangled in the shovel carrying supports.

It is a still further object of my invention to provide a cultivator shovel which will turn the earth circumferentially in such a manner as to completely cover adjacent grasses and weeds.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims without departing from the spirit of the invention.

Figure 1:
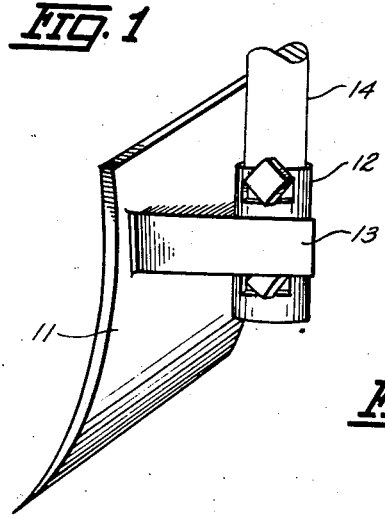
Figure 1 is a view in perspective of a cultivator blade in operating position.

Referring now to the drawings, and more particularly to Figure 1, the blades consist primarily of the pointed plate 11 curved in the vertical direction only, a mounting sleeve 12, a diagonal brace 13 between the mounting sleeve and the forward edge of the cylindrical plate, this assembly being mounted on the bar 14 of the cultivator.

Figure 2:
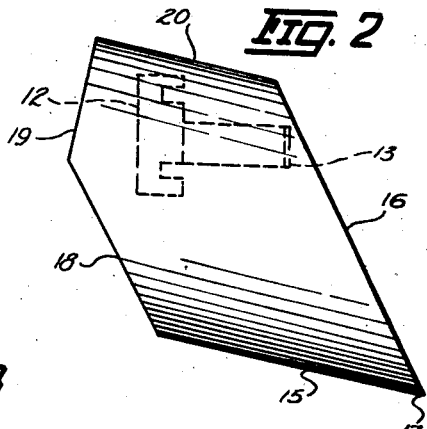
Figure 2 is a side view of the blade shown in Figure 1, particularly showing the angular relationship of the leading and cutting edges and in relation to the ground.

Referring now to Figure 2, the configuration of the plate 11 is shown in greater detail. The cutting edge 15 is the sharpened portion of the blade. It will be noted, by reference to Figure 4, that in operation this edge is carried in angular relation to the ground, the apex of the angle being in the direction of movement of the blade itself. The leading edge 16 of the blade is blunt and not sharpened, but it is important to my invention that the angular relation between the cutting edge 15 and the leading edge 16 be approximately 50 degrees. This provides a relatively sharp point 17 which, together with the cylindrical shape of the blade, creates the suction required to operate in a wide range of soil conditions, from very dry to extremely wet.

Figure 3:
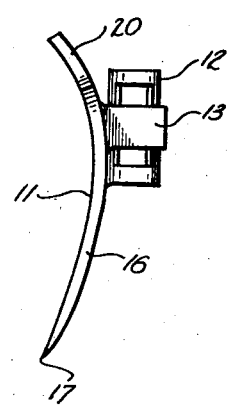
Figure 3 is an end view of a cultivator blade showing more particularly the radius of curvature thereof.

Referring again to the curved shape of the blade and particularly as shown in Figure 3; I have found that a radius of approximately 6 inches is necessary, both for purposes of creating the desired suction, and to cause the circumferential rolling of the dirt necessary to carry out the functions of the device.

Referring again to Figure 2, the trailing edge of the blade is formed in two portions. The lower portion is the angular edge 18 which is positioned at approximately 130 degrees in relation to the cutting edge 15. The second or upper edge 19 is vertical and at 90 degrees in relation to edge 15. The top edge of the blade 20 is parallel to the cutting edge 15.

In operation, the mounting bracket 12 is positioned angularly on the back side of the plate in such a manner that the blade cutting edge can be carried in an angular relation to the ground line. This mounting is such that the angle of the edge 15 can be varied from 13 to 18 degrees and thereby maintain the shovel in an operative position. It is also desirable to carry the point 17 at a depth of 1 to 2 inches below the ground level.

Figure 4:
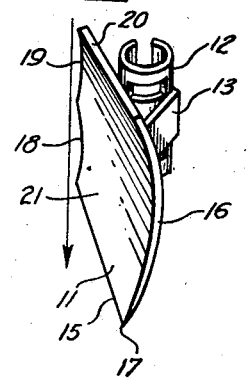
Figure 4 is a perspective view of the cultivator blade showing the angular positioning thereof in relation to the direction of travel.
Figure 5:
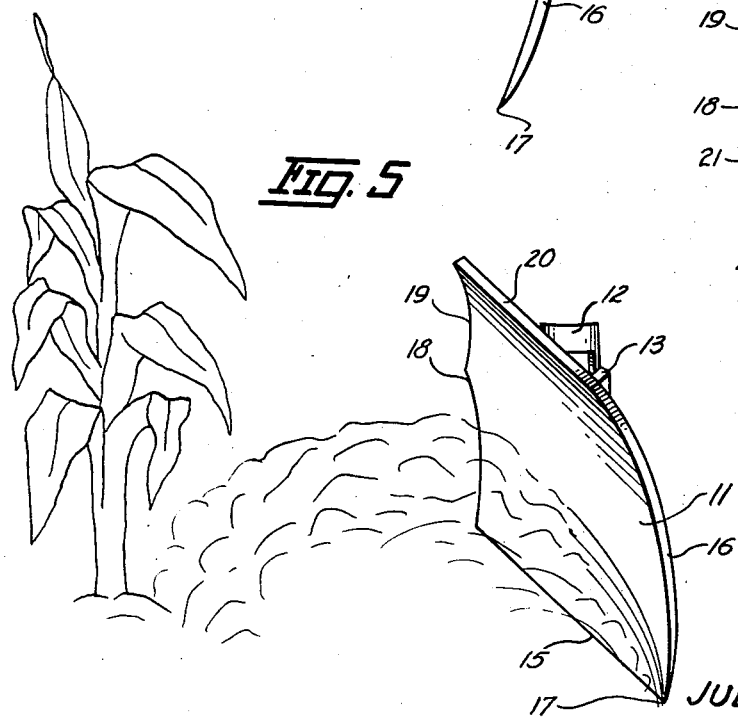
Figure 5 is a view in perspective of a cultivator blade showing the manner in which it turns the dirt circumferentially in relation thereto.

Referring now to Figure 4, the mounting bracket is positioned such that the shovel may be carried in an angular position in relation to the direction of travel, this angle to be varied within the limits of 30 to 36 degrees. The configuration of the shovel is such that at a position of 30 degrees, the dirt is rolled circumferentially, shedding from the top edge of the blade 20 at substantially right angles thereto, and falling back on the surface covering the weeds and grass opposite the face 21 of the cultivator blade. If the blade is angled to the opposite extreme of approximately 36 degrees, the blade then shoves the dirt in a substantially forward direction, shedding it off of the trailing edge 19 close to the face of the blade.

It will be apparent that by varying this angle within the limits set forth, the distance and angle that the dirt is thrown away from the blade can be varied according to the results desired. It will be further apparent that substantially the full length of the cutting edge will perform a shearing action in forward movement in relation to the dirt. Turning the shovel any substantial degree beyond either of these angular limits, considerably reduces the effectiveness of the tool and increases the loading. The configuration of the blade, that is, the substantially cylindrical vertical arc, the angular relation of the cutting and leading edges, and the nature of the resultant point, the positioning of the mounting bracket 12 in relation to the shovel itself, all serve to achieve the primary objects of the device.

Of course it will be apparent that the cultivator blade constructed according to my invention may be made in either a right or left configuration, and when used in pairs, one shovel on each side of the crop row, will cause the soil on both sides of the plant to be turned inwardly toward the stalk.

In actual practice I have found that blades constructed according to my invention will penetrate soil that cannot be worked by conventional tools, largely because conventional tools do not have the suction required under circumstances such as extreme dryness and the like. It has also been found that speeds in excess of 5 miles per hour are most satisfactory to cause the proper throwing of the dirt circumferentially to cover the weeds and grass adjacent the crop root.

Although I have described the preferred embodiment of my invention, it is apparent that modifications thereof may be made by those skilled in the art. Such modifications may be made without departing from the spirit and scope of my invention as set forth in the appended claims.

I claim as my invention:

1. In a cultivator shovel, a longitudinal vertically curved plate, said plate having a sharpened straight lower cutting edge and a blunt forward edge positioned vertically approximately 50 degrees therefrom, a trailing portion comprising two edges, the lower edge adjacent the cutting edge being angularly related thereto at approximately 130 degrees, the second upper rear edge being at 90 degrees in relation to the cutting edge, a top edge, and a tubular mounting bracket positioned on the back side of the blade and adapted to be carried in a vertical axis, said blade being affixed angularly on said mounting bracket such that the lower cutting edge describes a line between 13 and 18 degrees from the horizontal, said tubular mounting further being affixed to said blade at an angle outwardly from the arc of said curved blade, whereby the top edge thereof will overhang the lower cutting edge to cause dirt to be shed inwardly into the furrow being cut, said mounting bracket further having horizontal slots and locking means therein to permit the bracket and blade to be turned radially within limits of 30 to 36 degrees in relation to the line of travel of said blade to cause dirt to be shed alternately off of the second upper edge or the top edge, depending on the selected setting between the limits heretofore set forth.

2. In a cultivator shovel, a vertically curved plate, the radius thereof being calculated to cause circumferential shedding of dirt therefrom at right angles thereto, said plate having a substantially horizontal lower cutting edge and a blunt forward edge positioned vertically approximately 50 degrees therefrom to form a point, a trailing portion comprising two angularly related sections, a top edge, and a tubular mounting bracket positioned on the back side of the blade and adapted to be carried in a vertical axis, said blade being affixed angularly on said mounting bracket such that the substantially horizontal lower cutting edge will be carried within a limited range of 13 to 18 degrees from the horizontal, said tubular mounting further being affixed to the blade at an angle outwardly from the vertical curvature thereof, whereby the top edge of said blade shall be in substantially the same plane as the lower cutting edge to cause dirt loosened by said cutting edge to be passed across the face of the blade and shed by the upper edge thereof inwardly to a point adjacent the line of travel of said lower cutting edge, said vertical bracket further having radially adjustable means therein to permit the angle of said blade to be varied within limits of 30 to 36 degrees in relation to the direction of travel to permit a light variation of the direction of shedding in relation to the direction of travel of said blade.

References Cited in the file of this patent

UNITED STATES PATENTS

| 493,389 | Shultz | Mar. 14, 1893 |
| 797,729 | Grabe | Aug. 22, 1905 |
| 1,522,751 | Sechler | Jan. 13, 1925 |
| 1,694,099 | Low | Dec. 4, 1928 |